(12) United States Patent
Paczkowski et al.

(10) Patent No.: US 9,538,489 B1
(45) Date of Patent: Jan. 3, 2017

(54) WIRELESS COMMUNICATION DEVICE TO SYNCHRONIZE DATA TRANSFER RATES

(71) Applicant: Sprint Communications Company L.P., Overland Park, KS (US)

(72) Inventors: Lyle Walter Paczkowski, Mission Hills, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 190 days.

(21) Appl. No.: 14/470,235

(22) Filed: Aug. 27, 2014

(51) Int. Cl.
*H04W 56/00* (2009.01)
*H04W 72/04* (2009.01)
*G11B 19/28* (2006.01)
*G11B 5/09* (2006.01)

(52) U.S. Cl.
CPC ............... *H04W 56/00* (2013.01); *G11B 5/09* (2013.01); *G11B 19/28* (2013.01); *H04W 72/048* (2013.01)

(58) Field of Classification Search
None
See application file for complete search history.

(56) References Cited

U.S. PATENT DOCUMENTS

| 7,542,728 | B2 | 6/2009 | Bitran et al. |
| 7,567,820 | B2 | 7/2009 | Bitran et al. |
| 8,099,127 | B2 | 1/2012 | Narathong et al. |
| 8,294,515 | B1 | 10/2012 | Riekki et al. |
| 8,345,545 | B2 | 1/2013 | Kokku et al. |
| 8,374,609 | B2 | 2/2013 | Somasundaram et al. |
| 8,521,125 | B2 | 8/2013 | Collins et al. |
| 8,819,447 | B2 | 8/2014 | Shipley et al. |
| 2001/0006472 | A1* | 7/2001 | Okano ............... G11B 5/00813 365/33 |
| 2009/0215442 | A1* | 8/2009 | Lindoff .................. H04B 1/036 455/423 |
| 2010/0205365 | A1* | 8/2010 | Huang .................. G06F 13/385 711/111 |
| 2012/0082082 | A1 | 4/2012 | Etemad et al. |
| 2012/0108250 | A1* | 5/2012 | Ahn ...................... H04L 1/0002 455/450 |
| 2012/0120944 | A1 | 5/2012 | Yang et al. |
| 2013/0039271 | A1 | 2/2013 | de la Garrigue |
| 2013/0322349 | A1 | 12/2013 | Hosangadi et al. |

OTHER PUBLICATIONS

U.S. Appl. No. 14/037,637, filed Sep. 26, 2013.

* cited by examiner

*Primary Examiner* — Ayaz Sheikh
*Assistant Examiner* — Peter Chau

(57) ABSTRACT

A wireless communication system to synchronize data transfer rates. A hard disk drive controller receives a first Long Term Evolution (LTE) Radio Resource Connection message generated by an eNodeB proposing a wireless communication network download data rate. The hard disk drive controller compares the proposed wireless communication network download rate in the first LTE RRC message with a hard disk drive storage data rate. If the proposed wireless communication network download rate is higher than the hard disk drive storage data rate, then the hard disk controller transfers a second LTE RRC message requesting a lower wireless communication network download rate.

20 Claims, 6 Drawing Sheets

WIRELESS COMMUNICATION DEVICE TO SYNCHRONIZE DATA TRANSFER RATES

TECHNICAL BACKGROUND

A hard disk drive is a data storage device used for storing digital information. Digital information can be stored (written) on and/or retrieved (read) from a hard disk drive. The rate at which digital information can be read from/written to a hard disk drive is the data transfer rate (or data/bit rate). Hard disk drives may have different data transfer rates. A hard disk controller enables communication with the hard disk drive. The hard disk controller may be integrated into the hard disk drive.

Wireless communication networks use wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication networks transfer data communications. Data transfer rates may vary across wireless communication networks. As wireless technology continues to advance, data transfer rates will continue to increase. For example, carrier aggregation and Multiple Input Multiple Output (MIMO) technologies are increasing a wireless communication network's data transfer rates. In addition, storage capabilities (i.e. memory size) will continue to increase. With increased storage capabilities, wireless communication devices may be used as hard drives. However, the wireless communication device's hard disk drive data rate may be different than the wireless communication network's data transfer rate. The difference in data transfer rates may cause network congestion.

OVERVIEW

Examples disclosed herein provide systems, methods, hardware, and software to synchronize data transfer rates. In one instance, a method for operating a wireless communication system to synchronize data transfer rates. The wireless communication system includes a wireless communication device that has a hard disk drive and a hard disk drive controller. The method comprises the hard disk controller receiving a first Long Term Evolution (LTE) Radio Resource Connection message generated by an eNodeB proposing a wireless communication network download data rate. The method further provides the hard disk drive controller comparing the proposed wireless communication network download rate in the first LTE RRC message with a hard disk drive storage data rate. If the proposed wireless communication network download rate is higher than the hard disk drive storage data rate, then the method further includes the hard disk controller transferring a second LTE RRC message requesting a lower wireless communication network download rate.

In another example, a wireless communication device synchronizes data transfer rates. The wireless communication device includes a hard disk drive and a hard disk drive controller that receives a first Long Term Evolution (LTE) Radio Resource Connection message generated by an eNodeB proposing a wireless communication network download data rate. The hard disk drive controller compares the proposed wireless communication network download rate in the first LTE RRC message with a hard disk drive storage data rate. If the proposed wireless communication network download rate is higher than the hard disk drive storage data rate, then the hard disk controller transfers a second LTE RRC message requesting a lower wireless communication network download rate.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
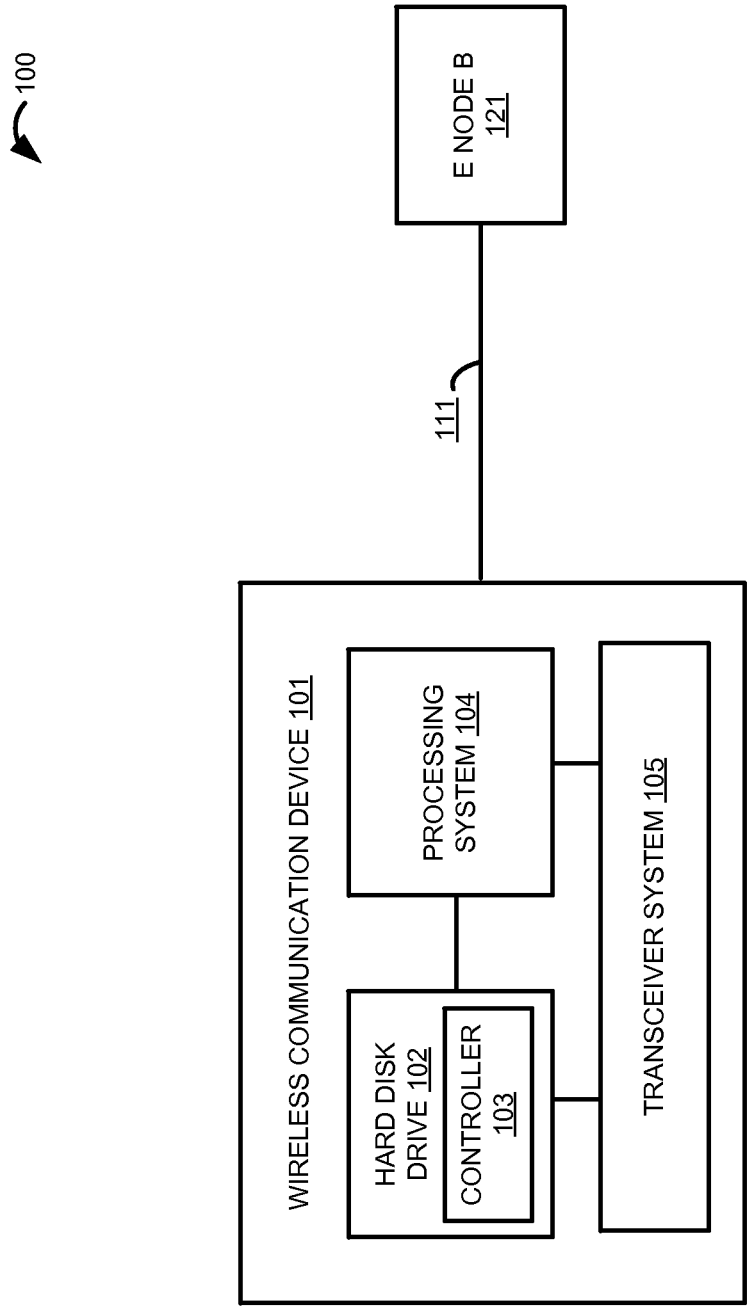
FIG. 1 illustrates a wireless communication system to synchronize data transfer rates.

FIG. 1 illustrates wireless communication system 100 to synchronize data transfer rates. Wireless communication system 100 includes wireless communication device 101 and eNodeB 121. Wireless communication device 101 and eNodeB 121 communication over wireless communication link 111. Wireless communication device 101 includes hard disk drive 102, processing system 104, and transceiver system 105. Hard disk drive 102 includes Hard Disk Drive (HDD) controller 103.

In operation, HDD controller 103 receives a first Long Term Evolution (LTE) Radio Resource Connection message generated by eNodeB 121 proposing a wireless communication network download data rate. Examples of a wireless communication network download data rate includes bit rate, data transfer rate, I/O rate, minimum/maximum Guaranteed Bit Rate (GBR), Access Point Name (APN) Aggregate Maximum Bit Rate (A-AMBR), User Equipment (UE) Aggregate Maximum Bit Rate (UE-AMBR), Quality of Service (QoS) Class Identifiers (QCIs). The proposed wireless communication network download data rate may be based on the type of service requested, such as voice, media, data, and/or other communication services—including combinations thereof. In other examples, the proposed wireless communication network download data rate may be based on other factors, such as device type, user, and/or other factors—including combinations thereof.

HDD controller 103 compares the proposed wireless communication network download rate in the first LTE RRC message with a hard disk drive storage data rate. Examples of a hard disk drive storage data rate include bitrate, bit rate, gross bit rate, raw bit rate, gross data transfer rate, uncoded transmission rate, net bit rate, information rate, useful bit rate, payload rate, net data transfer rate, coded transmission rate, and/or other data rates—including combinations thereof.

If the proposed wireless communication network download rate is higher than the hard disk drive storage data rate, then HDD controller 103 transfers a second LTE RRC message requesting a lower wireless communication network download rate. In some examples, the proposed wireless communication network download rate is lower than the hard disk drive storage data rate, and HDD controller 103 transfers a second LTE RRC message requesting a higher wireless communication network download rate.

Examples of wireless communication device 101 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Hard disk drive 102 may be physical device(s) that are used to store digital information, such as Random Access Memory (RAM), hard disk drives, solid state drives, hard drives, external memory devices (Universal Serial Bus (USB) storage devices and Secure Digital (SD) memory cards), and/or other memory devices—including combinations thereof. HDD controller 103 may include a host adapter, peripheral bus, and/or hard disk controller. Transceiver system 104 may communicate using Long Term Evolution (LTE) protocols.

Figure 2:
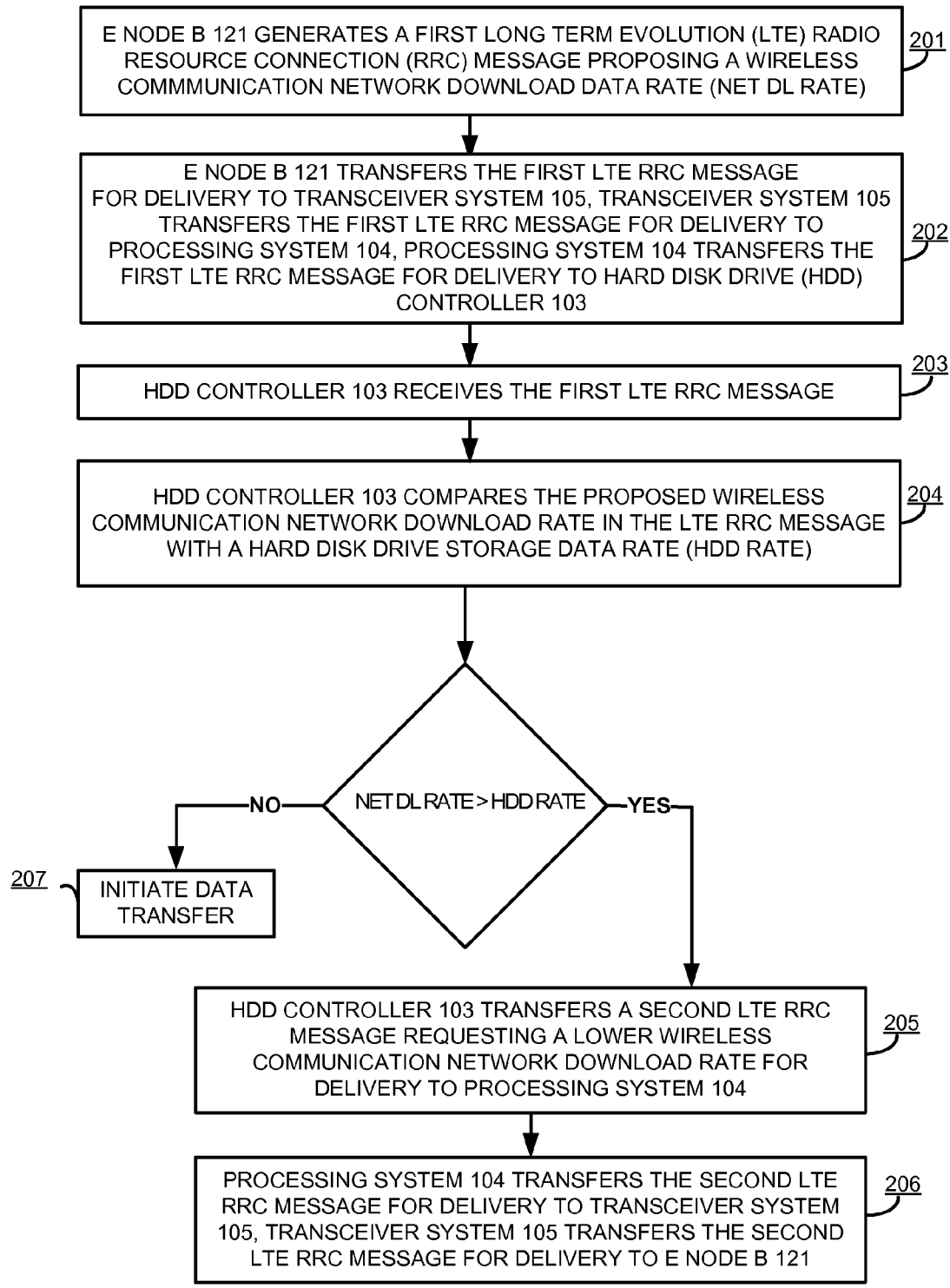
FIG. 2 illustrates the operation of the wireless communication system to synchronize data transfer rates.

FIG. 2 illustrates the operation of wireless communication system 100 to synchronize data transfer rates. ENodeB 121 generates a first Long Term Evolution (LTE) Radio Resource Connection message proposing a wireless communication network download data rate (201). ENodeB 121 transfers the first LTE RRC message for delivery to transceiver system 105, transceiver system 105 transfers the first LTE RRC message for delivery to processing system 104, and processing system 104 transfers the first LTE RRC message for delivery to HDD controller 103 (202).

In some examples, the first LTE RRC message is transferred in response to wireless communication device 101 transferring an attach request to eNodeB 121. ENodeB 121 transfers the first LTE RRC message to a wireless communication network to establish a default bearer. For example, wireless communication device 101 may be requesting a communication session. Examples of communication sessions include voice calls, data exchanges, data transfers, requests for web page(s), streaming media (music/movies), text message, and/or other data transfers—including combinations thereof.

In some examples, the first LTE RRC message is transferred from eNodeB 121 for delivery to transceiver system 105. Transceiver system 105 transfers the first LTE RRC message for delivery to processing system 104. Processing system 104 receives the first LTE RRC message and determines whether to transfer for delivery to HDD controller 103. For instance, there may be a trigger, such as the requested service that determines when processing system 104 should transfer the first LTE RRC message to HDD controller 103. In other examples, processing system 104 always transfers the first LTE RRC message for delivery to HDD controller 103. Although not required, wireless transceiver system 105 may transfer the first LTE RRC message for delivery directly to HDD controller 103.

HDD controller 103 receives the first LTE RRC message (203). HDD controller 103 compares the proposed wireless communication network download rate in the first LTE RRC message with a hard disk drive storage data rate (204). If the proposed wireless communication network download rate is higher than the hard disk drive storage data rate, then HDD controller 103 transfers a second LTE RRC message requesting a lower wireless communication network download rate for delivery to processing system 104 (205). Processing system 104 transfers the second LTE RRC message for delivery to transceiver system 10, transceiver system 105 transfers the second LTE RRC message for delivery to eNodeB 121 (206). In some examples, HDD controller 103 may transfer the second LTE RRC message for delivery to transceiver system 105, bypassing processing system 104.

In some examples, if the proposed wireless communication network download rate is lower than the hard disk drive storage data rate, then HDD controller 103 transfers a second LTE RRC message requesting a higher wireless communication network download rate. In other examples, the proposed wireless communication network download rate is lower than the hard disk drive storage data rate, and the transfer is initiated with the lower wireless communication network download rate. In yet other examples, the proposed wireless communication network download rate is equal to the hard disk drive storage data rate, and the data transfer is initiated without further signaling (207).

Figure 3:
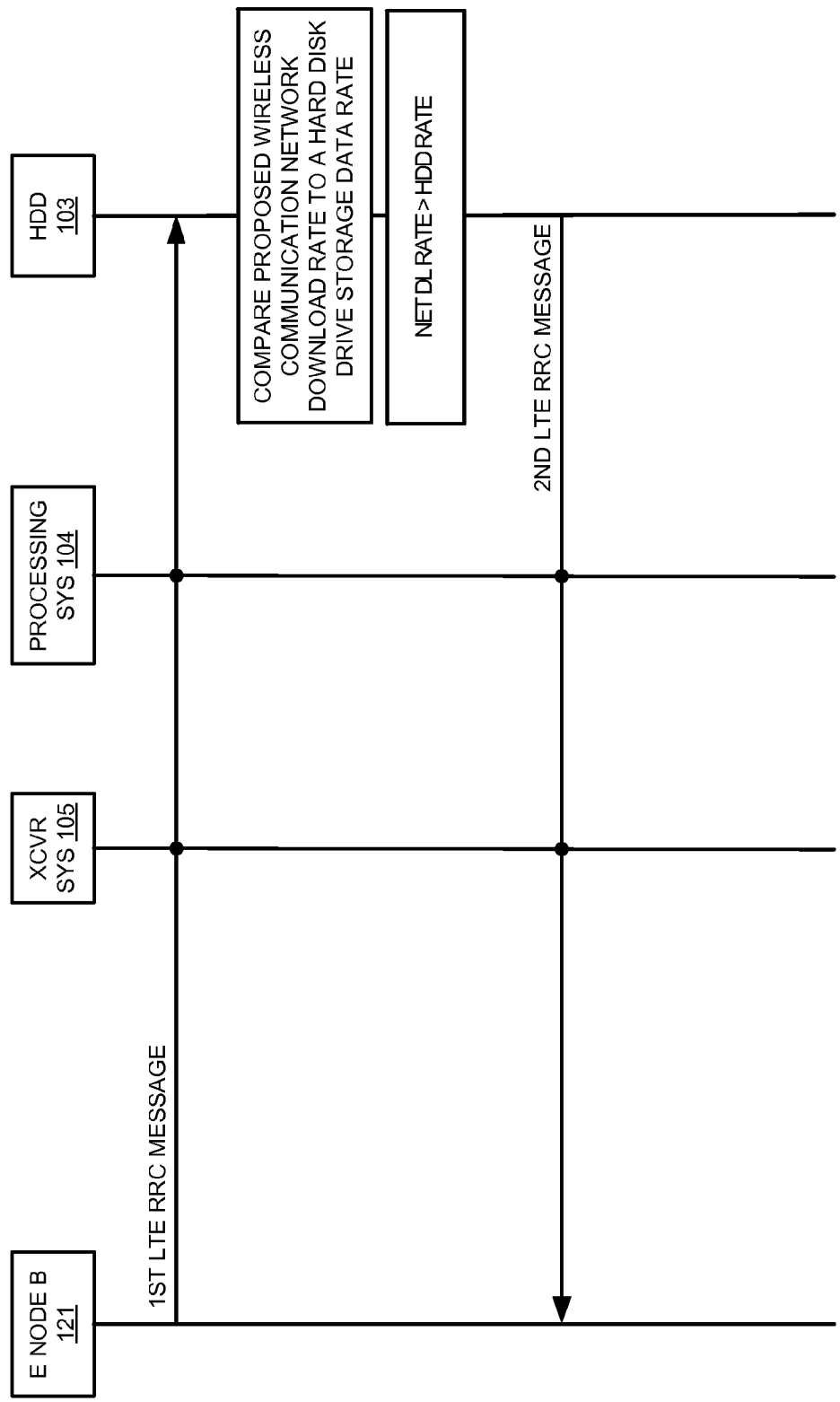
FIG. 3 illustrates the operation of the wireless communication system to synchronize data transfer rates.

FIG. 3 illustrates the operation of wireless communication system 100 to synchronize data transfer rates. HDD controller 103 receives a first Long Term Evolution (LTE) Radio Resource Connection message generated by eNodeB 121 proposing a wireless communication network download data rate. RRC message may be transferred from eNodeB 121 to transceiver system 105, then to processing system 104, and then to HDD controller 103. In other examples, the RRC message is transferred from eNodeB 121 to transceiver system 105, then to hard disk controller 103.

HDD controller 103 compares the proposed wireless communication network download rate in the first LTE RRC message with a hard disk drive storage data rate. In some examples, processing system 104 may compare the proposed wireless communication network download rate and the hard disk drive storage data rate.

If the proposed wireless communication network download rate is higher than the hard disk drive storage data rate, then HDD controller 103 transfers a second LTE RRC message requesting a lower wireless communication network download rate. In some examples, synchronizing data transfer rates may be done each time a new data session is requested, such as during the setup of a default bearer and associated dedicated bearers. In other examples, synchronizing data transfer rates may be done when previous requests have failed or errored out due to hard disk buffers being overloaded.

Figure 4:
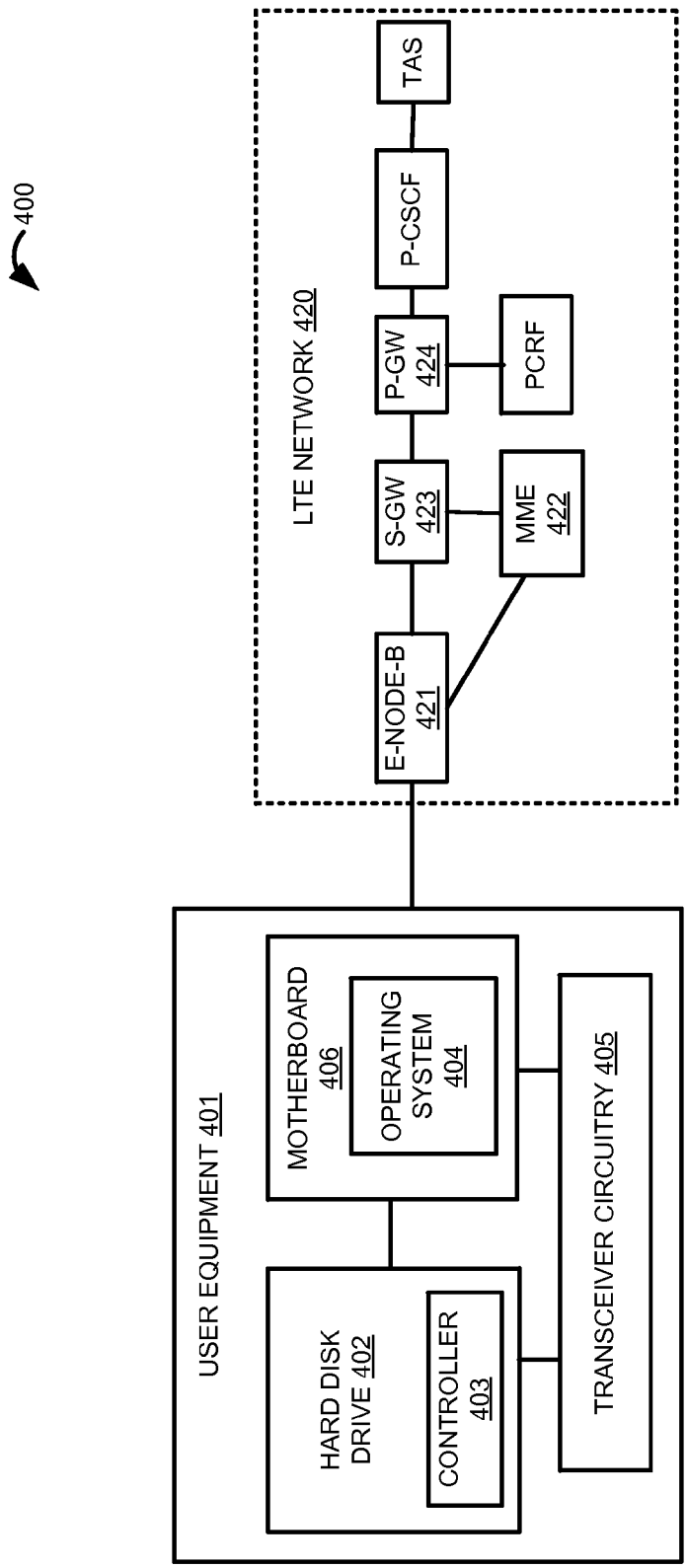
FIG. 4 illustrates a wireless communication system to synchronize data transfer rates.

FIG. 4 illustrates wireless communication system 400 to synchronize data transfer rates. Wireless communication system 400 includes User Equipment (UE) 401 and LTE network 420. LTE network 420 includes eNodeB 421, Mobility Management Entity (MME) 422, Serving Gateway (S-GW) 423, and Packet Data Network (PDN) Gateway (P-GW) 424. LTE network 420 may include other components that have been omitted for clarity. UE 401 includes hard disk drive 402, operating system 404 and transceiver system 405. Hard disk drive 402 includes hard disk drive (HDD) controller 403.

In operation, HDD controller 403 receives a first Long Term Evolution (LTE) Radio Resource Connection message generated by eNodeB 421 proposing a wireless communication network download data rate. HDD 403 compares the proposed wireless communication network download rate in the first LTE RRC message with a hard disk drive storage data rate. If the proposed wireless communication network download rate is higher than the hard disk drive storage data rate, then HDD controller 403 transfers a second LTE RRC message requesting a lower wireless communication network download rate. For example, carrier aggregation or MIMO technologies may increase the data rate of LTE network 420.

Figure 5:
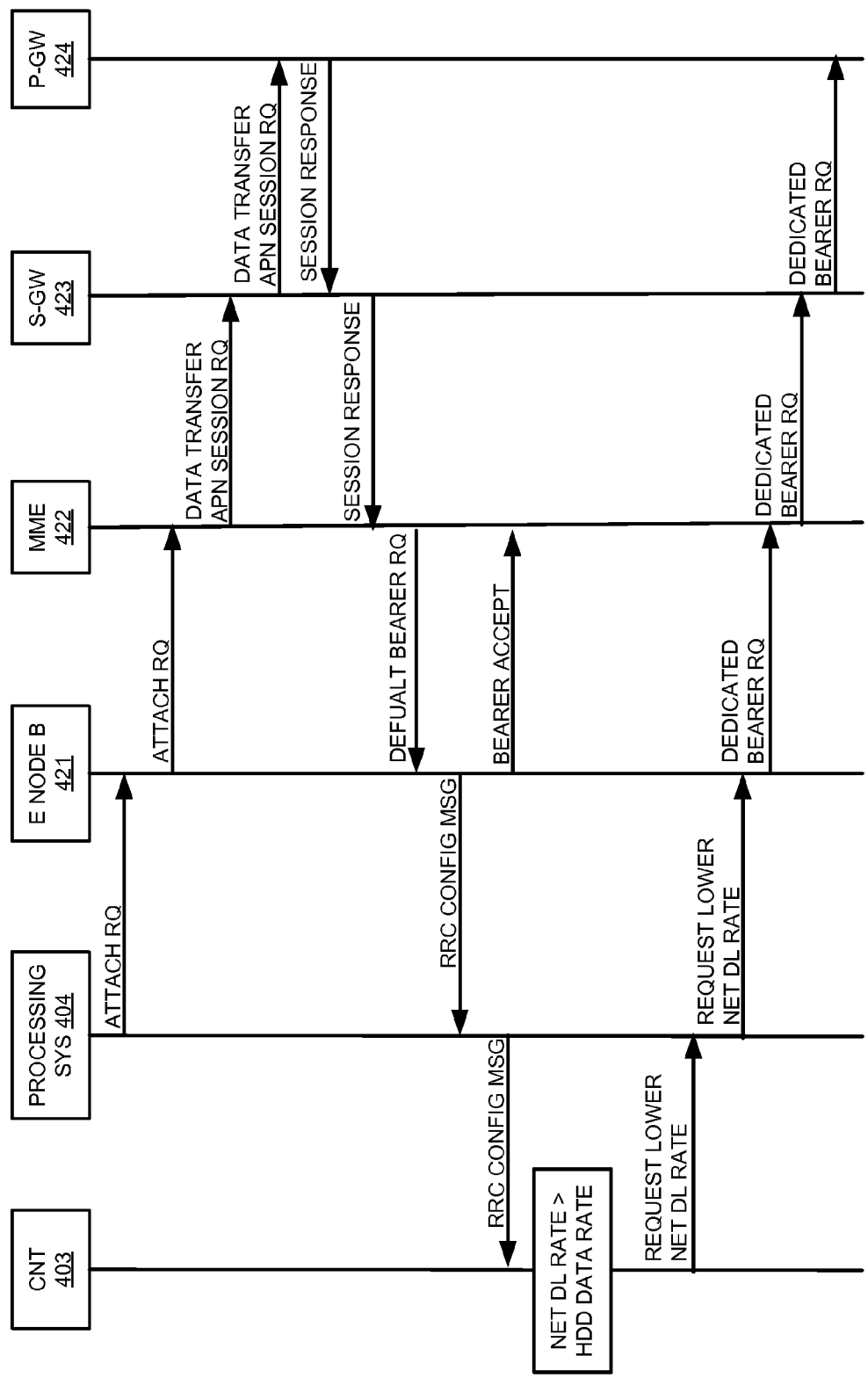
FIG. 5 illustrates the operation of the wireless communication system to synchronize data transfer rates.

FIG. 5 illustrates the operation of wireless communication system 400 to synchronize data transfer rates. For example, UE may request a data transfer APN. In a simplified example, UE 401 sends an attach request to eNodeB 421. ENodeB 421 transfers the attach request to MME 422. MME 422 queries the HSS to authenticate the UE. The HSS sends authentication information to MME 422. MME 422 authenticates UE 401. MME 422 also transfers a session request to S-GW 423. S-GW 423 transfers the session request to P-GW 424. P-GW 424 returns a session response to S-GW 423. S-GW 423 forwards the session response to MME 422. MME 422 then transfers a bearer request to eNodeB 421. ENodeB 421 transfers a Radio Resource Connection (RRC) configuration message for delivery to processing system 404.

In some examples, processing system 404 transfers all RRC configuration messages to HDD controller 403. In other examples, processing system 404 determines whether or not to transfer the RRC configuration message to HDD controller 403. For instance, if the communication session is associated with a video download APN or the request was sent to a certain Uniform Resource Identifier (URI), such as www.netflix.com, processing system 404 will transfer the RRC configuration message to HDD controller 403. Although not required, a trigger or some other signaling may be used to notify processing system 404 to transfer the RRC configuration message(s). ENodeB 421 also sends a bearer accept response to MME 422. This sets up the default bearer for the communication session between UE 401 and P-GW 424. HDD controller 403 compares the wireless communication network download rate in the RRC configuration message with its hard disk drive data rate. If the wireless communication network download rate is higher than the hard disk drive data rate, then HDD controller 403 transfers a RRC message requesting a lower wireless communication network download rate. The network may lower the data rate for the default bearer. In some examples, a dedicated bearer, requesting lower wireless communication network download rate may also be established.

Figure 6:
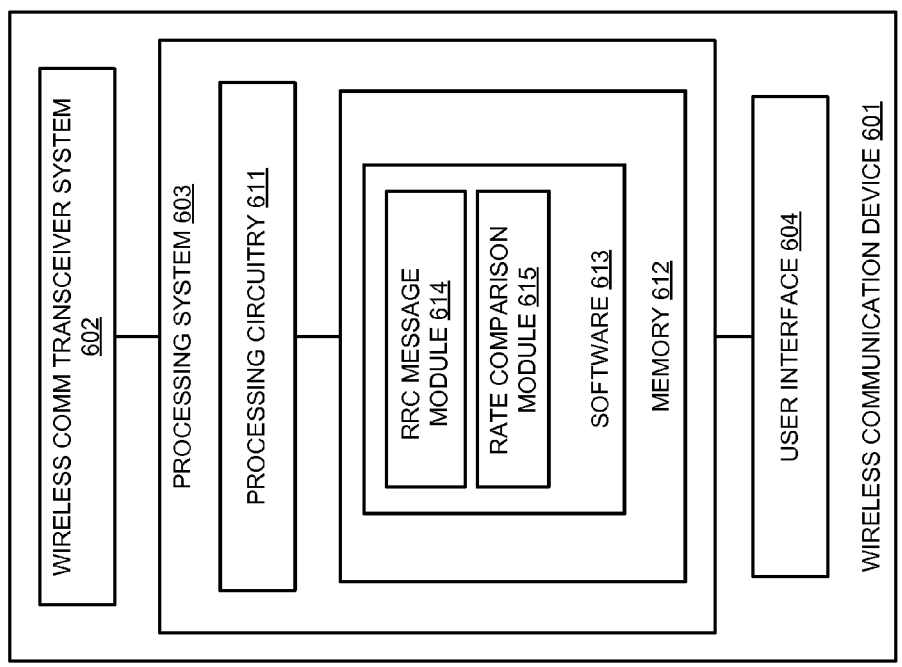
FIG. 6 illustrates an example of a wireless communication device to synchronize data transfer rates.

FIG. 6 illustrates wireless communication device 601. Wireless communication device 601 is an example of wireless communication device 101 and UE 401, although wireless communication device 101 and UE 401 could use alternative configurations. Wireless communication device 601 comprises wireless communication transceiver system 602, processing system 603, and user interface 604. Processing system 603 is linked to wireless communication transceiver system 602 and user interface 604. Processing system 603 includes processing circuitry 611 and memory 612 that stores operating software 613. Software 613 comprises RRC message module 614 and rate comparison module 615.

Wireless communication device 601 may include other well-known components such as a battery and enclosure that are not shown for clarity. Wireless communication device 601 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 602 comprises RF communication circuitry and an antenna. The RF communication circuitry typically includes an amplifier, filter, RF modulator, and signal processing circuitry. Wireless communication transceiver system 602 may also include a memory device, software, processing circuitry, or some other communication device. Wireless communication transceiver system 602 may use various communication formats, such as CDMA, EVDO, WIMAX, GSM, LTE, WIFI, HSPA, or some other wireless communication format—including combinations thereof.

User interface 604 comprises components that interact with a user to receive user inputs and to present media and/or information. User interface 604 may include a speaker, microphone, buttons, lights, display screen, touch screen, touch pad, scroll wheel, communication port, or some other user input/output apparatus—including combinations thereof. User interface 604 may be omitted in some examples.

Processing circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus. Processing circuitry 611 is typically mounted on a circuit board that may also hold memory 612, portions of wireless communication transceiver system 602, and user interface 604. Operating software 613 comprises computer programs, firmware, or some other form of machine-readable processing instructions. Operating software 613 may include an operating system, utilities, drivers, network interfaces, applications, or some other type of software.

When executed, software 613 directs processing system 603 to operate as described herein to synchronize data transfer rates. In particular, RRC message module 614 directs processing system 603 to receive and transfer LTE RRC messages. Rate comparison module 615 compares the proposed wireless communication network download rate in the first LTE RRC message with a hard disk drive storage data rate.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

ENodeB 121 comprises RF communication circuitry and an antenna. The RF communication circuitry typically includes an amplifier, filter, RF modulator, and signal processing circuitry. ENodeB 121 may also comprise a router, server, memory device, software, processing circuitry, cabling, power supply, network communication interface, structural support, or some other communication apparatus.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. ENodeB 121 may use other communication links to communicate with the rest of the wireless communication network. The communication links may use metal, glass, air, space, or some other material as the transport media. The other communication links could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. The communication links could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device having a hard disk drive, the method comprising:
   in a hard disk drive controller, receiving a first Long Term Evolution (LTE) Radio Resource Connection (RRC) message generated by an eNodeB proposing a wireless communication network download data rate;
   in the hard disk drive controller, comparing the proposed wireless communication network download rate in the first LTE RRC message with a hard disk drive storage data rate; and
   when the proposed wireless communication network download rate is higher than the hard disk drive storage data rate, then transferring a second LTE RRC message requesting a lower wireless communication network download rate.

2. The method of claim 1 further comprising:
   in a wireless transceiver, receiving the first LTE RRC message and transferring the first LTE RRC message to an Operating System (OS); and
   in the OS, transferring the first LTE RRC message to the hard disk drive controller.

3. The method of claim 1 further comprising:
   in a wireless transceiver, receiving the first LTE RRC message and transferring the first LTE RRC message to the hard disk drive controller.

4. The method of claim 1 further comprising:
   in the hard disk drive controller, transferring the second LTE RRC message for delivery to an operating System (OS); and
   in the OS, transferring the second LTE RRC message to a wireless transceiver.

5. The method of claim 1 further comprising:
   in the hard disk drive controller, transferring the second LTE RRC message for delivery to a wireless transceiver.

6. The method of claim 1 wherein the proposed wireless communication network download rate comprises a minimum Guaranteed Bit Rate (GBR).

7. The method of claim 1 wherein the proposed wireless communication network download rate comprises a maximum Guaranteed Bit Rate (GBR).

8. The method of claim 1 wherein the proposed wireless communication network download rate comprises an Access Point Name (APN) Aggregate Maximum Bit Rate (A-AMBR).

9. The method of claim 1 wherein the proposed wireless communication network download rate comprises a User Equipment Aggregate Maximum Bit Rate (UE-AMBR).

10. The method of claim 1 wherein the wireless communication device transfers an attach request to the eNodeB and the eNodeB transfers the first LTE RRC message to establish a default bearer.

11. A wireless communication device comprising:
    a hard disk drive controller is configured to receive a first Long Term Evolution (LTE) Radio Resource Connection (RRC) message generated by an eNodeB proposing a wireless communication network download data rate;
    the hard disk drive controller is configured to compare the proposed wireless communication network download rate in the first LTE RRC message with a hard disk drive storage data rate; and
    when the proposed wireless communication network download rate is higher than the hard disk drive storage data rate, then the hard disk drive controller is configured to transfer a second LTE RRC message requesting a lower wireless communication network download rate.

12. The wireless communication device of claim 11 further comprising:
    a wireless transceiver is configured to receive the first LTE RRC message and to transfer the first LTE RRC message to an Operating System (OS); and
    the OS is configured to transfer the first LTE RRC message to the hard disk drive controller.

13. The wireless communication device of claim 11 further comprising:
    a wireless transceiver is configured to receive the first LTE RRC message and to transfer the first LTE RRC message to the hard disk drive controller.

14. The wireless communication device of claim 11 further comprising:
    the hard disk drive controller is configured to transfer the second LTE RRC message for delivery to an operating System (OS); and
    the OS is configured to transfer the second LTE RRC message to a wireless transceiver.

15. The wireless communication device of claim 11, wherein the hard disk drive controller is configured to transfer the second LTE RRC message for delivery to a wireless transceiver.

16. The wireless communication device of claim 11 wherein the proposed wireless communication network download rate comprises a minimum Guaranteed Bit Rate (GBR).

17. The wireless communication device of claim 11 wherein the proposed wireless communication network download rate comprises a maximum Guaranteed Bit Rate (GBR).

18. The wireless communication device of claim 11 wherein the proposed wireless communication network download rate comprises an Access Point Name (APN) Aggregate Maximum Bit Rate (A-AMBR).

19. The wireless communication device of claim 11 wherein the proposed wireless communication network download rate comprises a User Equipment Aggregate Maximum Bit Rate (UE-AMBR).

20. The wireless communication device of claim 11 wherein the wireless communication device transfers an attach request to the eNodeB and the eNodeB transfers the first LTE RRC message to establish a default bearer.

* * * * *